United States Patent
Avkarogullari et al.

(10) Patent No.: US 10,229,471 B2
(45) Date of Patent: Mar. 12, 2019

(54) GRAPHICS PROCESSING UNIT PROVIDING THERMAL CONTROL VIA RENDER QUALITY DEGRADATION

(71) Applicant: Apple, Inc., Cupertino, CA (US)

(72) Inventors: Gokhan Avkarogullari, Cupertino, CA (US); Jason P. Jane, Cupertino, CA (US); Alex Kan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 71 days.

(21) Appl. No.: 15/248,499

(22) Filed: Aug. 26, 2016

(65) Prior Publication Data

US 2017/0061570 A1    Mar. 2, 2017

Related U.S. Application Data

(60) Provisional application No. 62/211,482, filed on Aug. 28, 2015.

(51) Int. Cl.
*G06T 1/20* (2006.01)
*G06F 1/3215* (2019.01)
*G06F 1/3234* (2019.01)

(52) U.S. Cl.
CPC ............... *G06T 1/20* (2013.01); *G06F 1/325* (2013.01); *G06F 1/3215* (2013.01)

(58) Field of Classification Search
CPC . G06T 1/20; G06T 7/40; G06T 11/001; G06F 1/3206; G06F 1/3215; G06F 1/3243
See application file for complete search history.

(56) References Cited

U.S. PATENT DOCUMENTS

| 9,087,161 | B1* | 7/2015 | Diamond | ............ G06F 13/4081 |
| 2014/0184623 | A1* | 7/2014 | Frascati | ................... G06T 1/20 345/522 |
| 2015/0006937 | A1* | 1/2015 | Rotem | ................... G06F 1/206 713/324 |

OTHER PUBLICATIONS

J. Bergman, "Energy ecient graphics: Making the rendring process power aware," Ph.D. dissertation, Uppsala University, 2010. (Year: 2010).*

* cited by examiner

*Primary Examiner* — Antonio A Caschera
(74) *Attorney, Agent, or Firm* — Baker & Hostetler LLP

(57) ABSTRACT

Power management techniques include a graphics processing unit (GPU) in which the GPU determines whether it is operating outside an operational limit and, when the GPU is operating outside the operational limit, the GPU alters performance of an operation to be performed texture processor within the GPU to reduce complexity of the operation. Otherwise, the GPU may perform the texture processing operation at its default complexity. These techniques provide a degree of power control not available in other techniques.

27 Claims, 4 Drawing Sheets

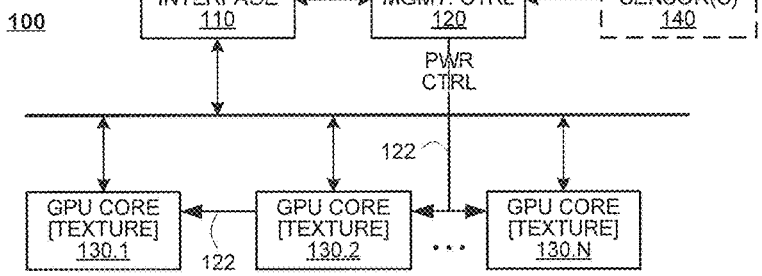
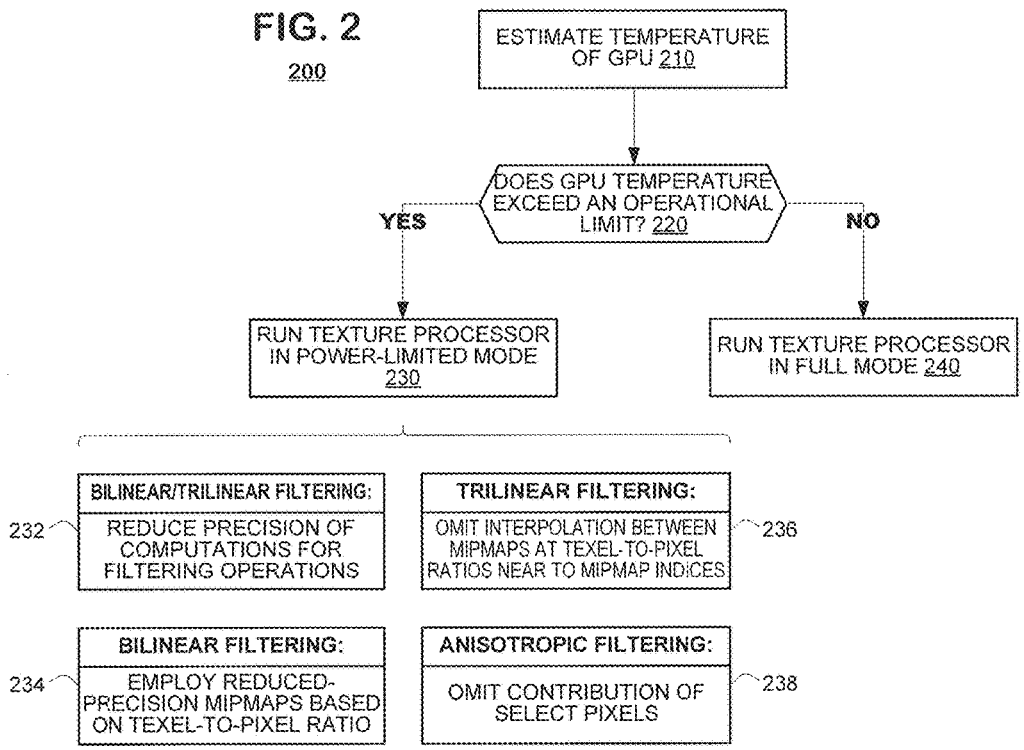

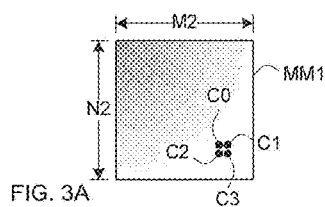
FIG. 3A
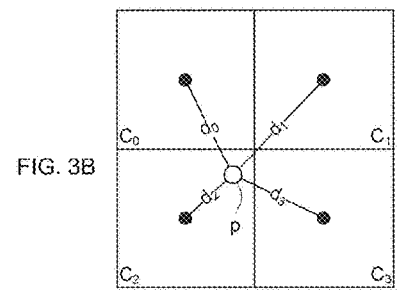
FIG. 3B
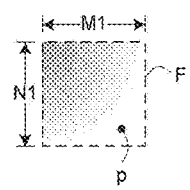
FIG. 3
300
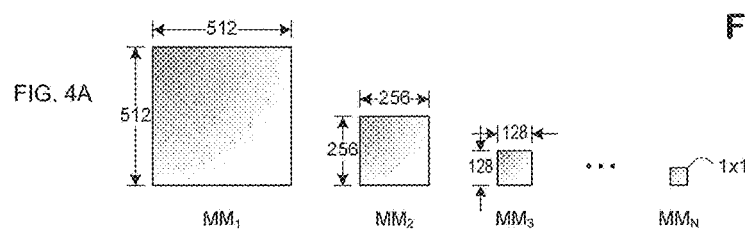
FIG. 4A
FIG. 4
400
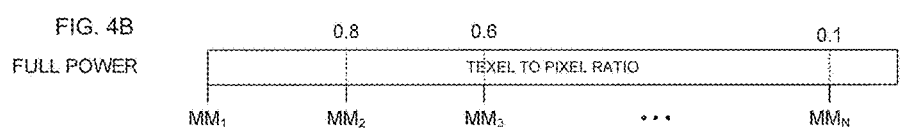
FIG. 4B
FULL POWER
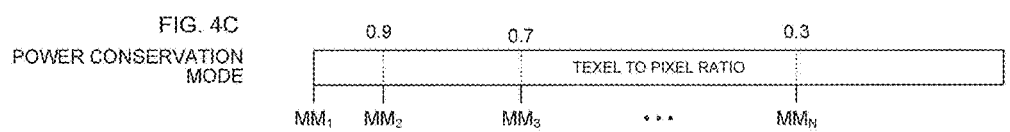
FIG. 4C
POWER CONSERVATION MODE

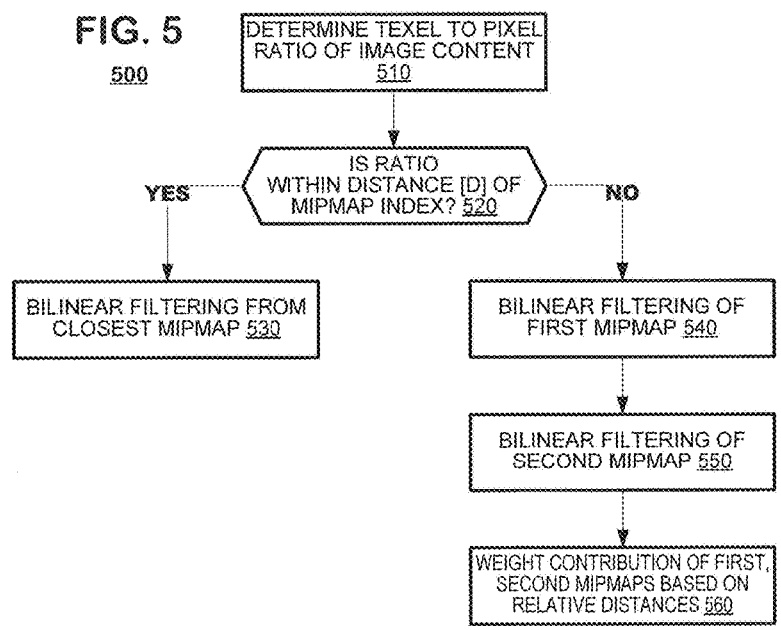
FIG. 5
500
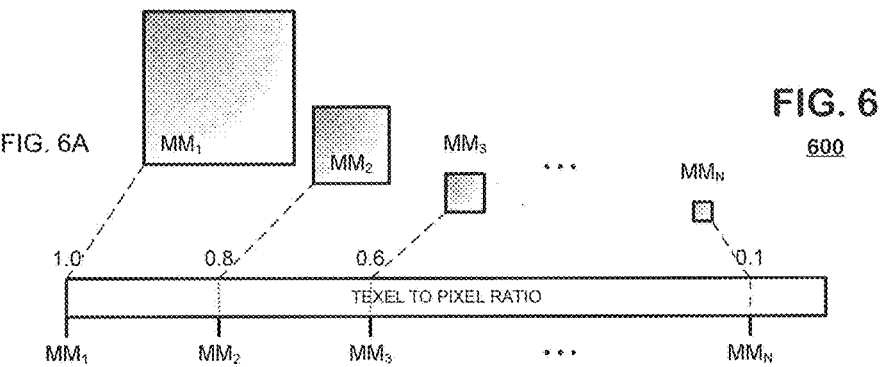
FIG. 6
600
FIG. 6A
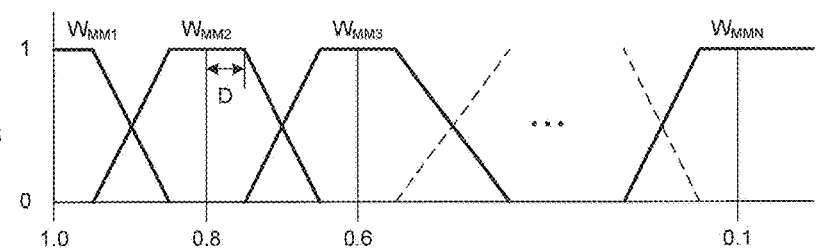
FIG. 6B

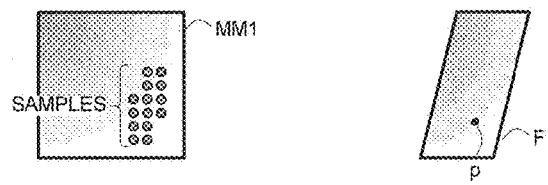
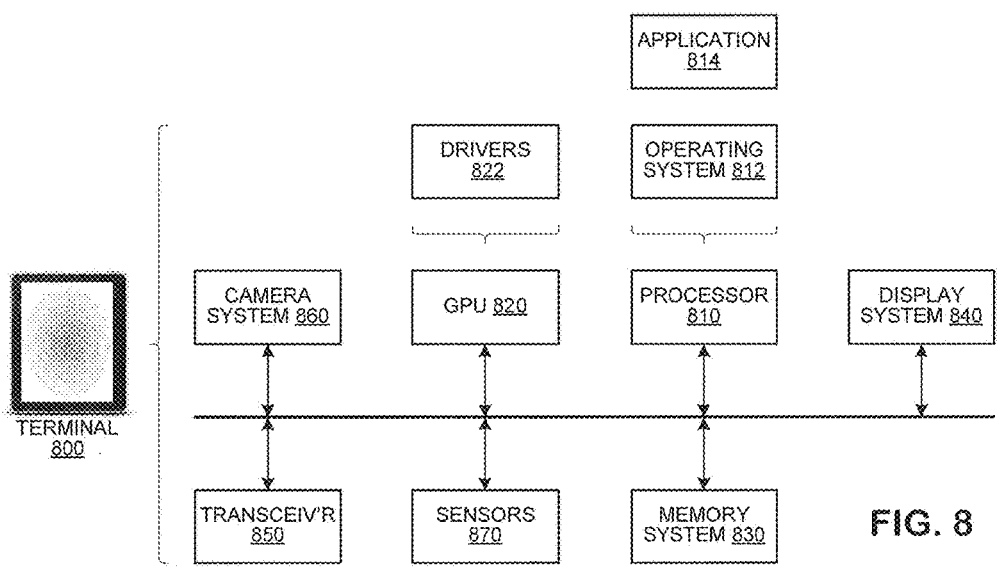
FIG. 7
700
FIG. 8

GRAPHICS PROCESSING UNIT PROVIDING THERMAL CONTROL VIA RENDER QUALITY DEGRADATION

CLAIM FOR PRIORITY

This application claims priority to U.S. Patent Application 62/211,482, titled "Graphics Processing Unit Providing Thermal Control Via Render Quality Degradation" and filed on Aug. 28, 2015.

BACKGROUND

The present disclosure relates to graphics processing units (GPUs) and, in particular, to GPUs that employ thermal control.

The processing power of modern integrated circuits has increased dramatically over the past decades. This increased processing capability has been exploited, in the case of GPUs, by providing GPUs that can perform graphics processing operations of increasing sophistication, which has led in kind to graphics output having increased complexity and visual appeal.

The increased power of these devices, however, incurs corresponding increases in the electrical power that they consume. Increase power consumption has drawbacks, particularly in the domain of portable electrical devices, in the form of reduced battery life. The increased power consumption also can cause GPUs to generate heat that can damage GPU circuitry. Accordingly, the inventors have proposed thermal mitigation techniques for GPUs to address these issues.

BRIEF DESCRIPTION OF THE DRAWINGS

FIG. 1 is a simplified block diagram of a graphics processing unit according to an embodiment of the present disclosure.

FIG. 2 illustrates a method according to an embodiment of the present disclosure.

FIG. 3 illustrates exemplary bilinear filtering operations in which reduced precision processing may be used according to an embodiment of the present disclosure.

FIG. 4 illustrates exemplary bilinear filtering operations that employ reduced precision mipmaps based on texel-to-pixel ratios according to an embodiment of the present disclosure.

FIG. 5 illustrates a method according to another embodiment of the present disclosure.

FIG. 6 illustrates operation of the method of FIG. 5.

FIG. 7 illustrates exemplary anisotropic filtering operations that employ reduced precision mipmaps based on texel-to-pixel ratios.

FIG. 8 is a system block diagram of a terminal in which the techniques of the foregoing embodiments may be used.

DETAILED DESCRIPTION

Embodiments of the present disclosure provide power management techniques for a GPU in which the GPU determines whether it is operating outside its operational limit and, when the GPU is operating outside its operational limits, the GPU alters performance of an operation to be performed by the texture processor within the GPU to reduce complexity of the operation. Otherwise, the GPU may perform the texture processing operation at its default complexity. These techniques provide a degree of power control not available in other techniques.

FIG. 1 is a simplified block diagram of a graphics processing unit (GPU) 100 according to an embodiment of the present disclosure. The GPU 100 may include a communication interface unit 110, a power management controller 120 and a plurality of GPU cores 130.1-130.N. The communication interface unit 110 may manage communication between the GPU 100 and other system components, such as other processors and/or memory units to which the GPU 100 is connected. The power management controller 120 may manage monitor temperature of the GPU 100 and engage power management operations as may be needed. The GPU cores 130.1-130.N may perform graphics processing operations on graphics data.

The GPU cores 130.1-130.N may be execution units that perform graphics processing operations on graphics data. For example, the GPU cores 130.1-130.N may include one or more three-dimensional (3D) cores that perform 3D graphics rendering, and one or more two-dimensional (2D) cores to render 2D images. The GPU cores 130.1-130.N each may include a pipeline of circuit systems that operate as unified shaders (vertex and pixel), pixel shaders, vertex shaders, texture processing units, rasterizers, and the like. The GPU 130.1-130.N cores may include caches to store data as it is processed by such pipelines. The GPU cores 130.1-130.N need not be identically provisioned to each other or symmetrical.

The power management controller 120 may determine that the GPU 100 is to operate in a power-limited mode of operation and control operation of the GPU cores 130.1-130.N when such determinations are made. In some embodiments, the power management controller 120 may make its determination in response to a message that the GPU 100 receives via the communication interface 110, requesting the GPU 100 to power down. The message may be transmitted, for example, by a driver executed by a CPU (not shown) in a system in which the GPU 100 operates. Alternatively, the power management controller 120 may make its determination from temperature sensor data provided to the GPU, for example, from sensor(s) 140 mounted within the GPU 100 itself and/or from sensors (not shown) mounted elsewhere in the device. In another embodiment, the power management controller 120 may make its determination from an estimate of the power consumption of the GPU 100 based on GPU processing load.

Regardless of the manner in which the power management controller 120 makes its determination, when the power management controller 120 determines that the GPU 100 is to operate in a power-limited mode, the power management controller 120 may issue power control commands 122 to texture processors within one or more of the GPU cores 130.1-130.N to lower their operating points. The power control commands 122 may be issued globally to all texture processors within the GPU 100 or, alternatively, may be addressed to texture processors individually or in groups. In an embodiment, a power control command 122 may be a signal, e.g., asserted to indicate a power-limited operation should begin and de-asserted to indicate operation may be performed at default levels (e.g., full power operation).

In another embodiment, the power management controller 120 may include parameter data in its power control commands that identify an operating point at which the texture processor should operate. This embodiment permits the power management controller 120 to gradually reduce the operating point of the texture processing units as power consumption varies within the device.

In an embodiment, the power management controller 120 may be a microcontroller that executes firmware from storage not shown). The storage may include non-volatile memory such as flash memory, programmable read-only memories, and volatile memory (e.g. random access memory) into which the firmware is loaded from other storage elements of the device. Alternatively, the power management controller 120 may be implemented as a fixed operation logic system that cycles through a predetermined state machine.

The communication interface 110 may receive transactions from a communication fabric 112 within a system in which the GPU 100 resides. The transactions may include commands from a CPU (not shown). The transactions may also include responses to read requests transmitted by the GPU 100, to read work descriptors from memory and/or to read data to be operated upon by the GPU 100. The interface 110 may also be configured to transmit the read requests, as well as write requests to write results generated by the GPU 100 to memory.

FIG. 2 illustrates a method 200 according to an embodiment of the present disclosure. The method 200 may begin by estimating a temperature of the GPU (box 210) and determining whether the GPU's temperature exceeds an operational limit of the GPU (box 220). If so, the method may cause the GPU's texture processing unit to run in a power-limited mode (box 230). Otherwise, the method 200 may cause the GPU's texture processing unit to run in a full power mode (box 240).

The power-limited mode of the texture processor (box 230) may occur in several ways. In one embodiment, bilinear and trilinear filtering operations may occur at reduced precision than in full power operation (box 232). In another embodiment, bilinear filtering operations may employ reduced-precision mipmaps at given texel-to-pixel ratios as compared to a full power mode (box 234). In a further embodiment, trilinear filtering operations may omit interpolation between mipmaps at texel-to-pixel ratios that are within predetermined distances of their indices (box 236). In yet another embodiment, anisotropic filtering operations may employ a reduced number of pixels to derive content as compared to full power operation (box 238). These embodiments are discussed in greater detail below.

The techniques of boxes 232-238 may be used singly or in combination with each other. In many implementations, the techniques of boxes 232-238 may be employed in staggered fashion to respond to increasing GPU temperature.

FIG. 3 illustrates exemplary bilinear filtering operations 300 in which reduced precision processing may be used (FIG. 2, box 232). Bilinear filtering generally involves interpolation of texture at one size from a mipmap of another size. Thus, FIG. 3(a) illustrates a frame F having size M1×N1 being interpolated from a mipmap $MM_1$ having size M2×N2. Pixels p in the frame F may be derived from source texture in the mipmap $MM_1$ according to a distance weighted average of texture elements $c_0$-$c_3$ from the mipmap $MM_1$ that represent the pixels' locations in the re-sized frame.

FIG. 3(b) illustrates a projection of an exemplary pixel p from frame F to the mipmap $MM_1$ and texture elements $c_0$-$c_3$ that may contribute to the pixel's content. The pixel p may be derived as:

$$p = \frac{\sum_{i=0}^{3} c_i \cdot d_i}{\sum_{i=0}^{3} d_i},$$ (Eq. 1.)

where $c_i$ represents the texture elements $c_0$-$c_3$ of the source mipmap $MM_1$ and $d_0$-$d_3$ represent distances respectively from the pixel's location in its projection into the source mipmap $MM_1$ to locations of the corresponding texture elements $c_0$-$c_3$.

Bilinear filtering ordinarily is done at full-precision within a GPU. That is, if computational units within the texture processor support mathematical calculations of 10-bit numbers, the texture processor typically performs the computations represented by Equation 1 using 10-bit operands. In order to operate the texture processor in a power-limited mode (FIG. 2, box 230), however, the texture processor may perform bilinear filtering on reduced precision data, for example, 6-bit or 8-bit values. Doing so may conserve power within the texture processor albeit generating pixel values at lower image quality than when operating the texture processor at full precision.

FIG. 4 illustrates exemplary bilinear filtering operations 400 that employ reduced precision mipmaps based on texel-to-pixel ratios (FIG. 2, box 234). Bilinear filtering often operates in conjunction with mipmaps $MM_1$-$MM_N$ of different sizes. FIG. 4(a) illustrates exemplary mipmaps $MM_1$-$MM_N$ of decreasing sizes from 512×512 pixels to 1×1 pixel. In this example, each intermediate mipmap (say, mipmap $MM_2$) is half the size of its next larger mipmap ($MM_1$) in each dimension.

Each mipmap $MM_1$-$MM_N$ may be indexed to a predetermined texel-to-pixel ratio. The texel-to-pixel ratio represents a size of texture content in an image that will be generated by the GPU. Often, this ratio is determined by a depth of image content within a field of view. For example, image content that appears farther away from a viewer in an image typically has a smaller texel-to-pixel ratio than other image content in the same image that appears to be closer to the viewer. Thus, the texel-to-pixel ratio may vary in different regions of a common image.

FIGS. 4(b) and 4(c) illustrate exemplary associations between the mipmaps of FIG. 4(a) and normalized texel-to-pixel ratio values. FIG. 4(b) illustrates an association that may be applied when the texture processing unit is operating at full power (FIG. 2, box 240). There, mipmap $MM_2$ is assigned to a texel-to-pixel ratio value of 0.8, mipmap $MM_3$ is assigned to a texel-to-pixel ratio value of 0.6 and mipmap $MM_N$ is assigned to a texel-to-pixel ratio value of 0.1. FIG. 4(c) illustrates an association that may be applied when the texture processing unit is operating at reduced power (FIG. 2, box 230). There, mipmap $MM_2$ is assigned to a texel-to-pixel ratio value of 0.9, mipmap $MM_3$ is assigned to a texel-to-pixel ratio value of 0.7 and mipmap $MM_N$ is assigned to a texel-to-pixel ratio value of 0.3. Thus, when a texture processor is set to a power-limited mode, the texture processor may employ altered assignments of mipmaps to texel-to-pixel ratios.

Altering assignments of the mipmaps to texel-to-pixel ratios may conserve power consumption in a texture processor because it causes the texture processor to employ lower precision texture content at relatively higher texel-to-pixel ratio values. During operation, a GPU may compute a texel-to-pixel ratio value of a pixel, then select a source mipmap to use as source texture for the bilinear filtering process based on the texel-to-pixel ratio value. The pixel value may be derived from the source mipmap as discussed with respect to Eq. 1. By altering the texel-to-pixel ratio assignments to mipmaps, the texture processor will employ lower precision mipmaps at given texel-to-pixel ratio values.

In the example of FIGS. 4(b) and 4(c), texel-to-pixel ratio values between 0.9-0.8 will cause a texture processor operating in a low power mode to use mipmap MM$_2$ as a source mipmap (FIG. 4(c)), rather than mipmap MM$_1$ FIG. 4(b)), which would be used in the full power mode. Similarly, texel-to-pixel ratio values between 0.7-0.6 will cause a texture processor operating in a low power mode to use mipmap MM$_3$ as a source mipmap (FIG. 4(c)), rather than mipmap MM$_2$ (FIG. 4(b)) in the full power mode. Similarly, texel-to-pixel ratio values between 0.3-0.1 will cause a texture processor operating in a low power mode to use mipmap MM$_N$ as a source mipmap (FIG. 4(c)), rather than mipmap MM$_{N-1}$ (not shown) in the full power mode. Use of reduced-complexity mipmaps may contribute to power conservation in the texture processor.

FIG. 5 illustrates a method 500 according to another embodiment of the present disclosure. The method 500 illustrates processing that may be performed during trilinear filtering to omit interpolation between mipmaps at texel-to-pixel ratios with threshold distances of their mipmap indices (FIG. 2, box 236). The method 500 may begin by determining a texel-to-pixel ratio of a pixel being generated (box 510). The method 500 may determine whether the pixel's texel-to-pixel ratio is within a threshold distance of a mipmap index (box 520). If so, the method may generate pixel content according to bilinear filtering from the mipmap whose index is within the threshold distance of the texel-to-pixel ratio (box 530).

If not, if the pixel's texel-to-pixel ratio is beyond a threshold distance of the mipmap indices, the method 500 may perform full trilinear filtering. The method 500 may perform bilinear filtering of pixel content from a first neighboring mipmap (box 540) and may perform bilinear filtering of pixel content from a second neighboring mipmap (box 550). Finally, the method 500 may compute final content of the pixel by averaging of the pixel values obtained from the two bilinear filtering operations, weighted according to relative distances between the pixel's texel-to-pixel ratio and the indices of the mipmaps that were used for bilinear filtering (box 560).

FIG. 6 illustrates operation 600 of the method of FIG. 5, again, with respect to an exemplary assignment of mipmaps MM$_1$-MM$_N$ to normalized texel-to-pixel ratios. In this example, shown in FIG. 6(a), mipmap MM$_1$ has an index assigned to a texel-to-pixel ratio of 1.0, mipmap MM$_2$ has an index assigned to a texel-to-pixel ratio of 0.8, mipmap MM$_3$ has an index assigned to a texel-to-pixel ratio of 0.6, and mipmap MM$_N$ has an index assigned to a texel-to-pixel ratio of 0.1.

When a pixel's texel-to-pixel ratio is calculated (FIG. 5, box 510), it may be compared to the indices of the various mipmaps and a determination may be made whether the pixel's texel-to-pixel ratio is within a threshold distance of any of the indices of these mipmaps MM$_1$-MM$_N$ (box 520). Consider an example where the threshold distance is 0.025. Pixels having texel-to-pixel ratios of 0.825-0.775 would cause the pixel's content to be calculated solely from mipmap MM$_2$ and pixels having texel-to-pixel ratios of 0.625-0.575 would cause the pixel's content to be calculated solely from mipmap MM$_3$ (box 530). Pixels having texel-to-pixel ratios of 0.775-0.625 would cause the pixel's content to be calculated from mipmaps MM$_2$ and MM$_3$ by boxes 540-560. FIG. 6(b) illustrates normalized contributions of each mipmap to a pixel's texture. Thus, a weight of mipmap MM$_2$ (shown as W$_{MM2}$) is shown as having a weight of 1 for pixel texel-to-pixel ratios within a threshold distance D of the 0.8 index value. Similarly, weights of the other mipmaps (W$_{MM1}$, W$_{MM3}$, etc.) are shown as having a weight of 1 for pixel texel-to-pixel ratios within a threshold distance of their indices. Weights of the mipmaps may vary based on the distance for pixel texel-to-pixel ratios outside the threshold distance of any mipmap index value.

The embodiment of FIG. 5 is expected to reduce power consumption of a texture processing unit by generating pixel data from a single mipmap when the pixel's texel-to-pixel ratio is within a threshold distance of that mipmap. Doing so avoids the cost of computing the pixel's value from a second mipmap and also avoids the cost of averaging the pixel values from the two mipmaps.

FIG. 7 illustrates exemplary anisotropic filtering operations 700 that employ reduced precision mipmaps based on texel-to-pixel ratios (FIG. 2, box 238). Anisotropic filtering generates pixel texture for image content that is at oblique viewing angles within a field of view. In this case, pixel content may be generated from mipmaps using a greater number of texture samples than would occur for bilinear filtering. For example, FIG. 7 illustrates a pixel p in an output frame F being generated from a plurality of samples from a source mipmap MM1. As with the bilinear case, contribution of texture from the source mipmap may be scaled according to the texture's distance from the pixel and also according to an estimate of the orientation of the texture in the field of view. And, of course, a pixel p may be generated from multiple mipmaps MM1, MM2, each sampled according to a respective sampling pattern.

Anisotropic filtering is computationally expensive. According to an embodiment of the present disclosure, when a texture processing unit is to operate in a power-limited mode, the texture processing unit may reduce the number of texture samples that are admitted to the anisotropic filtering calculations. For example, if a given anisotropic filtering calculation operating at full power accepts 32 texture samples as input, at reduced-power mode, the same calculation may accept only 16 samples as input. All other samples that ordinarily would contribute to the calculation would be ignored.

The foregoing techniques are extensions to the inventors' other proposals, which gated operation of the GPU for periods of time. See, for example, Ser. No. 14/021,945, entitled "Processor Power and Performance Manager." filed Sep. 9, 2013; U.S. application Ser. No. 13/466,622, entitled "Graphics Power Control with Efficient Power Usage During Stop," filed May 12, 2012; and U.S. application Ser. No. 13/466,597, entitled "Graphics Hardware Mode Controls," filed May 8, 2012, the disclosures of which are incorporated herein by reference. Gating operation of the GPU can lead to reduced frame rates in the graphics data that the GPU generates. With the techniques described hereinabove, the GPU may operate continuously, albeit in a power-limited mode that reduces precision of the output graphics data.

The techniques described herein may be used cooperatively with the power gating operations of those prior proposals. For example, as the temperature of the GPU increases, the GPU may employ the techniques of the foregoing embodiments in an effort to remain within the GPU's thermal budget. If the temperature continues to increase notwithstanding the power mitigation techniques of FIG. 2, the GPU may initiate gating operations which may induce periodic shut downs of the GPU.

FIG. 8 is a system block diagram of a terminal 800 in which the techniques of the foregoing embodiments may be used. The terminal 800 may include a processor 810, a GPU 820, a memory system 830, a display system 840, a transceiver 850, a camera system 860, and various sensors 870.

The processor 810 may operate as a central processing unit of the terminal 800 and may execute various program instructions that define an operating system 812 and various applications 814 at work on the terminal 800. The operating system 812 and/or applications 814 may issue commands that invoke the GPU 820 to perform its operations, including the texture processing operations described hereinabove. The program instructions may be stored by the memory system 830 along with application data.

The GPU 820 may generate image data that is output to the display 840. The GPU 820 may operate according to program instructions representing GPU drivers 822, which may be stored by the memory system 830. These program instructions may invoke operations described hereinabove in FIGS. 1-7.

Typically, the memory system 830 will include a dedicated graphics memory system (not shown) into which the GPU 820 may output image data as it is generated. The display system 840 may retrieve the image data from the graphics memory and render it on a display device.

The sensors 870 may include an array of temperature and/or power consumption sensors (not shown) from which the GPU 820 may decide to enter power limited modes of operation. Temperature sensors may be provided both within the integrated circuit(s) that comprise the GPU 820 and also may be mounted elsewhere in the terminal 800, for example, on the terminal's housing (not shown). Power consumption sensors may measure voltage supplies to the GPU 820 and optionally to other components to measure voltage and current consumed by those devices. The GPU 820 may include inputs (not shown) to receive data from those sensors directly. Alternatively, the processor 810 may review data from those sensors and issue commands to the GPU 820 to enter its power-limited modes.

Although FIG. 8 illustrates a single shared communication fabric that connects all the devices 810-870 in the terminal 800, in practice, the device may include one or more dedicated communication pathways that link smaller numbers of the devices. For example the display system 840 may have its own communication pathway that allows it to retrieve image data from the graphic memory without sharing the pathway with other devices. Such implementation details are immaterial to the present discussion.

The foregoing discussion has described operation of the embodiments of the present disclosure in the context of terminals that embody encoders and/or decoders. Commonly, these components are provided as electronic devices. They can be embodied in integrated circuits, such as application specific integrated circuits, field programmable gate arrays and/or digital signal processors. Alternatively, they can be embodied in computer programs that execute on personal computers, notebook computers, tablet computers, smartphones or computer servers. Such computer programs typically are stored in physical storage media such as electronic-, magnetic- and/or optically-based storage devices, where they are read to a processor under control of an operating system and executed. Similarly, decoders can be embodied in integrated circuits, such as application specific integrated circuits, field programmable gate arrays and/or digital signal processors, or they can be embodied in computer programs that are stored by and executed on personal computers, notebook computers, tablet computers, smartphones or computer servers. Decoders commonly are packaged in consumer electronics devices, such as gaming systems, DVD players, portable media players and the like; and they also can be packaged in consumer software applications such as video games, browser-based media players and the like. And, of course, these components may be provided as hybrid systems that distribute functionality across dedicated hardware components and programmed general-purpose processors, as desired.

Several embodiments of the disclosure are specifically illustrated and/or described herein. However, it will be appreciated that modifications and variations of the disclosure are covered by the above teachings and within the purview of the appended claims without departing from the spirit and intended scope of the disclosure.

We claim:

1. A method, comprising:
   determining whether a graphics processing unit (GPU) is operating outside an operational limit,
   when the GPU is operating outside the operational limit, altering an original operation to be performed by a texture processor within the GPU to reduce complexity of the original operation and performing the altered operation by the texture processor at the reduced complexity,
   otherwise, performing the original operation operating by the texture processor at its default complexity.

2. The method of claim 1, wherein the altering comprises reducing a bit size of operands on which the texture processor operates.

3. The method of claim 1, wherein the altering comprises altering assignments between source mipmaps of texture and texel-to-pixel ratios to which they correspond, wherein at least one mipmap is assigned to a higher texel-to-pixel ratio for the reduced complexity operation than for the default complexity operation.

4. The method of claim 1, wherein the altering comprises, for a trilinear filtering operation:
   determining a texel-to-pixel ratio (TPR) of a pixel to be generated,
   determining a distance from the pixel's TPR to TPR indices that are associated with respective source mipmaps,
   when the distance between the pixel's TPR and a TPR of one of the source mipmaps is less than a distance threshold, generating texture data for the pixel from the one source mipmap, and
   otherwise, generating texture data for the pixel from a pair of source mipmaps having TPR indices that are closest to the pixel's TPR.

5. The method of claim 1, wherein the altering comprises, for anisotropic filtering, reducing a number of samples on which the anisotropic filtering operates as compared to the anisotropic filtering at default complexity.

6. The method of claim 1, wherein the determining comprises estimating a temperature of the GPU, and the operational limit is a thermal limit.

7. The method of claim 1, wherein the determining comprises estimating a temperature of a device in which the GPU is located, and the operational limit is a thermal limit.

8. The method of claim 1, wherein the determining comprises estimating a power consumption of the GPU, and the operational limit is a power limit.

9. The method of claim 1, wherein the determining comprises receiving a command from a device outside the GPU commanding the GPU to enter a reduced-power mode of operation.

10. A graphics processor, comprising:
    a GPU core including a texture processor,
    a power management controller that, responsive to a consumption event, issues a power control command to the texture processor,
    wherein, responsive to an assertion of the power control command, the texture processor alters an original operation to a reduced-complexity operation and performs the altered operation at its reduced complexity, and when the power control command is not asserted, the texture processor performs the original operation at its default complexity.

11. The processor of claim 10, wherein the texture processor, at reduced complexity, processes reduced bit size operands as compared to default complexity.

12. The processor of claim 10, wherein the texture processor, at reduced complexity, processes source texture mipmaps using altered assignments between the texture mipmaps and texel-to-pixel ratios to which they correspond, wherein at least one mipmap is assigned to a higher texel-to-pixel ratio for the reduced complexity operation than for the default complexity operation.

13. The processor of claim 10, wherein, for trilinear filtering, the texture processor, at reduced complexity:
generates texture data for a pixel from one source mipmap, when a distance from the pixel's texel-to-pixel ratio (TPR) to a TPR index of the source mipmap is less than a threshold distance, and
generates texture data for the pixel from a pair of source mipmaps having TPR indices that are closest to the pixel's TPR when no distance from the pixel's TPR to the TPR indices of the source mipmaps is less than the threshold distance.

14. The processor of claim 10, wherein, for anisotropic filtering, the texture processor, at reduced complexity, reduces a number of samples on which the anisotropic filtering operates as compared to the anisotropic filtering at default complexity.

15. The processor of claim 10, further comprising a temperature sensor on the GPU, wherein the power management controller generates the power control command in response to data from the temperature sensor.

16. The processor of claim 10, further comprising a power sensor on the GPU, wherein the power management controller generates the power control command in response to data from the power sensor.

17. The processor of claim 10, further comprising a communication interface, wherein the power management controller generates the power control command in response to a command received from the communication interface.

18. A device, comprising:
a central processor, graphics processor and memory in mutual communication,
the graphics processor, comprising:
a GPU core including a texture processor,
a power management controller that, responsive to a consumption event, issues a power control command to the texture processor,
wherein, responsive to an assertion of the power control command, the texture processor alters an original operation to a reduced-complexity operation and performs the altered operation at its reduced complexity, and
when the power control command is not asserted, the texture processor performs the original operation at its default complexity.

19. The device of claim 18, wherein the texture processor, at reduced complexity, processes reduced bit size operands as compared to default complexity.

20. The device of claim 18, wherein the texture processor, at reduced complexity, processes source texture mipmaps using altered assignments between the texture mipmaps and texel-to-pixel ratios to which they correspond, wherein at least one mipmap is assigned to a higher texel-to-pixel ratio for the reduced complexity operation than for the default complexity operation.

21. The device of claim 18, wherein, for trilinear filtering, the texture processor, at reduced complexity:
generates texture data for a pixel from one source mipmap, when a distance from the pixel's texel-to-pixel ratio (TPR) to a TPR index of the source mipmap is less than a threshold distance, and
generates texture data for the pixel from a pair of source mipmap having TPR indices that are closest to the pixel's TPR when no distance from the pixel's TPR to the TPR indices of the source mipmaps is less than the threshold distance.

22. The device of claim 18, wherein, for anisotropic filtering, the texture processor, at reduced complexity, reduces a number of samples on which the anisotropic filtering operates as compared to the anisotropic filtering at default complexity.

23. A non-transitory computer readable storage device storing program instructions that, when executed by a graphics processing unit (GPU), causes the GPU to:
determine whether the GPU is operating outside its operational limits,
when the GPU is operating outside its consumption limits, alter an original operation to a reduced-complexity operation and perform the altered operation at its reduced complexity, and
otherwise, perform the original operation at its default complexity.

24. The storage device of claim 23, wherein the altered operation reduces a bit size of operands on which the texture processor operates.

25. The storage device of claim 23, wherein the altered operation alters assignments between source mipmaps of texture and texel-to-pixel ratios to which they correspond, wherein at least one mipmap is assigned to a higher texel-to-pixel ratio for the reduced complexity operation than for the default complexity operation.

26. The storage device of claim 23, wherein the altered operation, for a trilinear filtering operation:
determines a texel-to-pixel ratio (TPR) of a pixel to be generated,
determines a distance from the pixel's TPR to TPR indices that are associated with respective source mipmaps,
when the distance between the pixel's TPR and the TPR of one of the source mipmaps is less than a distance threshold, generates texture data for the pixel from the one source mipmap, and
otherwise, generates texture data for the pixel from a pair of source mipmaps having TPR indices that are closest to the pixel's TPR.

27. The storage device of claim 23, wherein the altered operation comprises, for anisotropic filtering, reducing a number of samples on which the anisotropic filtering operates as compared to the anisotropic filtering at default complexity.

* * * * *